United States Patent
Robichaux et al.

(10) Patent No.: US 6,246,951 B1
(45) Date of Patent: Jun. 12, 2001

(54) TORQUE BASED DRIVER DEMAND INTERPRETATION WITH BAROMETRIC PRESSURE COMPENSATION

(75) Inventors: Jerry Dean Robichaux, Riverview; Tobias John Pallett, Ypsilanti, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/306,332

(22) Filed: May 6, 1999

(51) Int. Cl.⁷ .................................................. G06F 15/78
(52) U.S. Cl. ........................................ 701/110; 701/115
(58) Field of Search ..................................... 701/101, 102, 701/103, 104, 105, 110, 111, 115, 55, 53, 54, 65; 123/396, 399, 436

(56) References Cited

U.S. PATENT DOCUMENTS

| | | |
|---|---|---|
| 4,353,272 | 10/1982 | Schneider et al. . |
| 4,697,561 | 10/1987 | Citron . |
| 4,730,708 | 3/1988 | Hamano et al. . |
| 4,739,483 | 4/1988 | Ina et al. . |
| 4,819,596 | 4/1989 | Yasuoka et al . |
| 4,943,921 * | 7/1990 | Baltusis et al. .......................... 701/55 |
| 4,951,627 | 8/1990 | Watanbe et al. . |
| 5,069,181 | 12/1991 | Togai et al. . |
| 5,078,109 | 1/1992 | Yoshida et al. . |
| 5,086,668 | 2/1992 | Fujiwara et al. . |

(List continued on next page.)

FOREIGN PATENT DOCUMENTS

| | | |
|---|---|---|
| 66831/81 | 9/1982 | (AU) . |
| 0 206 091 B1 | 12/1986 | (EP) . |
| 0 340 764 | 11/1989 | (EP) . |
| 0 408 767 B1 | 1/1991 | (EP) . |
| 0 413 031 B1 | 2/1991 | (EP) . |
| 0 557 299 B1 | 10/1991 | (EP) . |
| 0 749 524 B1 | 2/1995 | (EP) . |
| 0 754 888 A2 | 1/1997 | (EP) . |
| 2 154 763 | 9/1985 | (GB) . |
| 2 239 500 | 7/1991 | (GB) . |
| 2 239 683 | 7/1991 | (GB) . |
| WO 95/01502 | 1/1995 | (WO) . |

OTHER PUBLICATIONS

"Hierarchial Control Strategy of Powertrain Functions", by H.M. Streib et al, 24. FISITA Congress, London Jun. 7–11, 1992, pp. 1–11.

"Torque–Based System Structure of the Electronic Engine Management System (ME7) as a New Base for Drive Train Systems", by J. Gerhardt et al, 6. Aachener Kolloquim Fahrzeug– und Motorentechnik '97, Oct. 22, 1997, pp. 817–849.

*Primary Examiner*—Willis R. Wolfe
(74) *Attorney, Agent, or Firm*—Allan J. Lippa

(57) ABSTRACT

A system and method for controlling a powertrain including an internal combustion engine include generating a signal indicative of driver requested engine output, generating a signal indicative of current vehicle speed, determining a reference engine output parameter based on the driver requested engine output signal and the signal indicative of current vehicle speed, determining a value indicative of current barometric pressure, modifying the reference engine output parameter based on the value indicative of current barometric pressure, and controlling the engine based on the modified reference parameter. In one embodiment, the invention adjusts a base driver demanded torque based on barometric pressure to preserve full pedal travel and prevent "dead pedal" feel when operating the vehicle at high altitudes and maximum engine torque output. As such, the accelerator pedal position is interpreted as a request for a portion or percentage of the currently available engine torque or power which varies as a function of the barometric pressure.

23 Claims, 3 Drawing Sheets

U.S. PATENT DOCUMENTS

| | | |
|---|---|---|
| 5,109,732 | 5/1992 | Takizawa . |
| 5,245,966 | 9/1993 | Zhang et al. . |
| 5,284,116 * | 2/1994 | Richeson, Jr. .................. 701/115 |
| 5,304,102 | 4/1994 | Narita et al. . |
| 5,325,740 | 7/1994 | Zhang et al. . |
| 5,351,776 | 10/1994 | Keller et al. . |
| 5,374,224 | 12/1994 | Huffmaster et al. . |
| 5,398,544 | 3/1995 | Lipinski et al. . |
| 5,407,401 | 4/1995 | Bullmer et al. . |
| 5,408,966 | 4/1995 | Lipinski et al. . |
| 5,408,974 | 4/1995 | Lipinski et al. . |
| 5,431,139 | 7/1995 | Grutter et al. . |
| 5,437,253 | 8/1995 | Huffmaster et al. . |
| 5,462,501 | 10/1995 | Bullmer et al. . |
| 5,484,351 | 1/1996 | Zhang et al. . |
| 5,501,644 | 3/1996 | Zhang . |
| 5,503,129 | 4/1996 | Robichaux et al. . |
| 5,520,159 | 5/1996 | Pao et al. . |
| 5,568,795 | 10/1996 | Robichaux et al. . |
| 5,575,257 | 11/1996 | Lange et al. . |
| 5,588,178 | 12/1996 | Liu . |
| 5,603,672 | 2/1997 | Zhang . |
| 5,605,131 | 2/1997 | Ohno et al. . |
| 5,606,951 | 3/1997 | Southern et al. . |
| 5,628,706 | 5/1997 | Zhang et al. . |
| 5,680,763 | 10/1997 | Unland et al. . |
| 5,692,471 | 12/1997 | Zhang . |
| 5,743,083 | 4/1998 | Schnaibel et al. . |
| 6,029,624 * | 2/2000 | Beechie et al. .................. 123/436 |

* cited by examiner

TORQUE BASED DRIVER DEMAND INTERPRETATION WITH BAROMETRIC PRESSURE COMPENSATION

TECHNICAL FIELD

The present invention is directed to a system and method for interpreting driver demand to control an engine.

BACKGROUND ART

Control strategies for internal combustion engines have evolved from purely electromechanical strategies to increasingly more complex electronic or computer controlled strategies. Spark-ignited internal combustion engines have traditionally used airflow as the primary control parameter, controlled by a mechanical linkage between a throttle valve and an accelerator pedal. Fuel quantity and ignition timing, originally mechanically controlled, were migrated to electronic control to improve fuel economy, emissions, and overall engine performance. Electronic airflow control systems including electronic throttle, variable cam timing, and the like, have been developed to further improve the authority of the engine controller resulting in even better engine performance.

Electronic throttle control replaces the traditional mechanical linkage between the accelerator pedal and the throttle valve with an "electronic" linkage through the engine or powertrain controller. Because of this electrical or electronic linkage, this type of strategy is often referred to as a "drive by wire" system. A sensor is used to determine the position of the accelerator pedal which is input to the controller. The controller determines the required airflow and sends a signal to a servo motor which controls the opening of the throttle valve. Control strategies which imitate the mechanical throttle system by controlling the opening of the throttle valve based primarily on the position of the accelerator pedal position are often referred to as pedal follower systems. However, the ability of the controller to adjust the throttle valve position independently of the accelerator pedal position offers a number of potential advantages in terms of emissions, fuel economy, and overall performance.

The driver controls output of the engine or powertrain primarily based on the position of the accelerator pedal. The engine control strategy must interpret this driver demand and set the appropriate engine control parameters to provide a corresponding powertrain output. The driver demand may be interpreted as a request for a particular throttle angle (pedal follower system), an engine torque, a wheel torque, or power (torque*speed). To achieve a consistent driver "feel", many prior art control strategies attempt to provide a constant powertrain output for a particular accelerator pedal position, regardless of the current operating conditions, such as barometric pressure. While these strategies consider the current operating conditions, such as barometric pressure, in determining the control parameters for the engine, the operating conditions are used to maintain a constant output independent of the operating conditions. However, this strategy may result in unsatisfactory performance when the available engine power is reduced, such as when driving at high altitude (low barometric pressure).

SUMMARY OF THE INVENTION

It is an object of the present invention to provide a system and method for controlling an internal combustion engine which compensates for variations in barometric pressure when interpreting the driver demand for requested powertrain output. As such, the present invention modifies the driver request for powertrain output based upon the currently available powertrain output which varies as a function of barometric pressure.

In carrying out the above object and other objects, advantages, and features of the present invention, a system and method for controlling a vehicular powertrain including an internal combustion engine to compensate for variation in currently available powertrain output include modifying a driver request for powertrain output based upon the currently available powertrain output. In one embodiment of the invention, the system and method include determining an accelerator pedal position, generating a signal indicative of current speed, generating a signal indicative of driver requested powertrain output based on the accelerator pedal position and the current speed, and determining a value indicative of current barometric pressure. The reference powertrain output parameter is then modified based on the current barometric pressure and used to control the powertrain output. Powertrain output may be determined using any number of parameters, such as engine torque or power, wheel torque or power, tractive effort, etc. Likewise, the current speed may represent engine speed, vehicle speed, wheel speed, etc.

The present invention provides a number of advantages over prior art control strategies. For example, by adjusting the base driver demanded torque in response to barometric pressure, full accelerator pedal travel is preserved and "dead pedal" feel is eliminated when operating the vehicle at high altitudes. As such, according to the present invention, the accelerator pedal position is interpreted as a request for a portion or percentage of the currently available engine torque or power which varies as a function of the barometric pressure.

The above advantages and other advantages, objects and features of the present invention will be readily apparent from the following detailed description of the best mode for carrying out the invention when taken in connection with the accompanying drawings.

BEST MODE(S) FOR CARRYING OUT THE INVENTION

Figure 1:
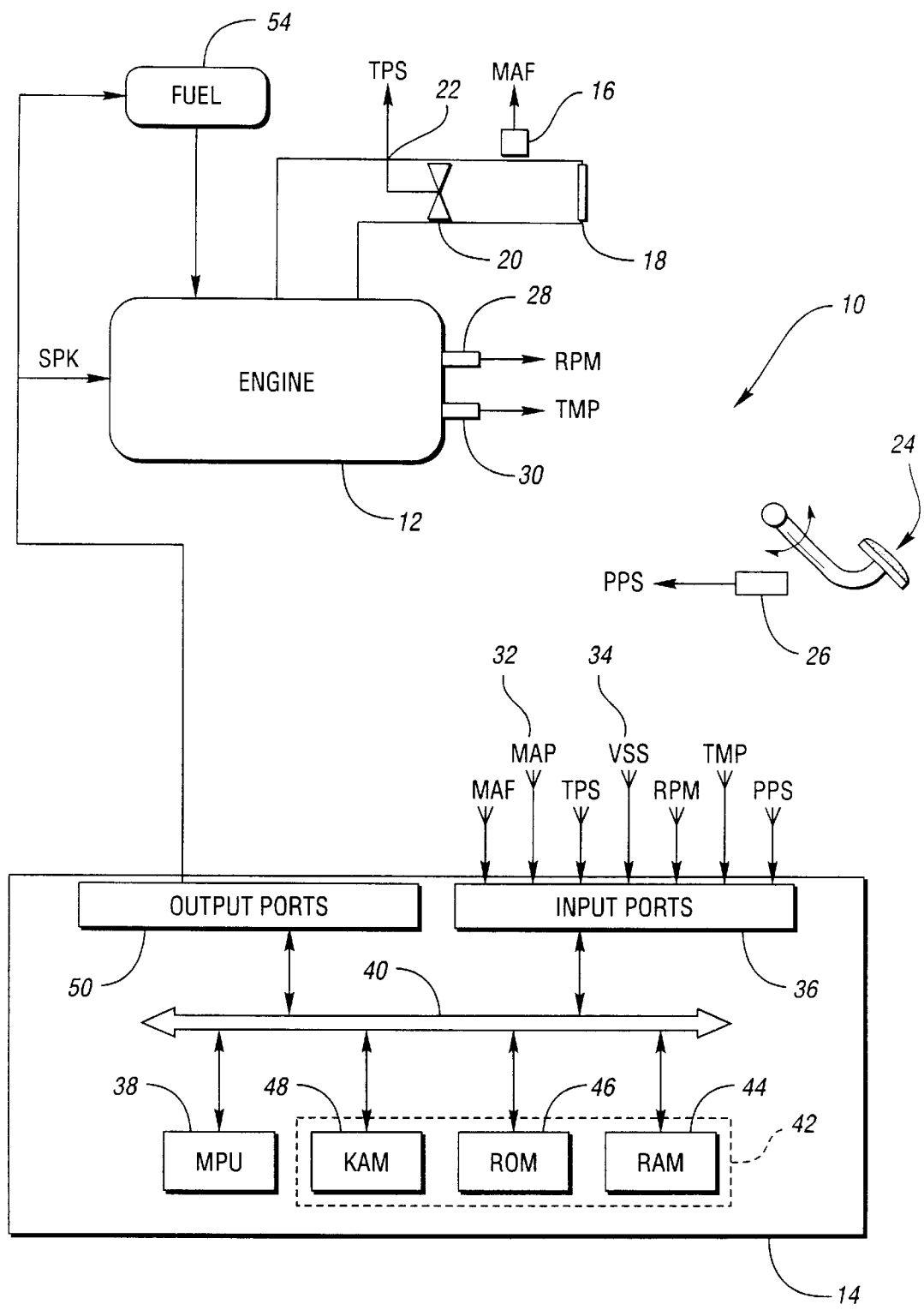
FIG. 1 is a block diagram illustrating a system and method for barometric pressure compensation according to the present invention.

FIG. 1 provides a block diagram illustrating operation of a system or method for interpreting driver demand with barometric pressure compensation according to the present invention. System 10 includes an internal combustion engine, indicated generally by reference numeral 12, in communication with a controller 14. Various sensors are provided to monitor engine operating conditions. Sensors may include a mass air flow sensor (MAF) 16 which monitors the air mass passing through intake 18. A throttle valve 20 may be used to regulate the air intake into engine 12 as well known in the art. A throttle position sensor (TPS) 22 provides an appropriate signal to controller 14 to monitor the throttle angle or position of throttle valve 20. An appropriate actuator such as a mechanical or electronic accelerator pedal 24 is used to determine the driver demand which, in turn, is used in the control of the position of throttle valve 20.

In a preferred embodiment, system 10 is an electronic throttle control system which uses a pedal position sensor (PPS) 26 to provide a signal indicative of the position of accelerator pedal 24. Controller 14 uses the pedal position sensor signal, along with various other signals indicative of current engine operating conditions, to control the position of throttle valve 20 via an appropriate servo motor (not shown). Such electronic throttle control or "drive-by-wire" systems are well known in the art.

Engine 12 may include various other sensors such as an engine speed sensor (RPM) 28, an engine temperature or coolant temperature sensor (TMP) 30, a manifold absolute pressure (MAP) sensor 32, a vehicle speed sensor (VSS) 34, and the like. Preferably, a sensor, such as MAP sensor 32, provides an indication of the absolute or relative barometric pressure. For applications which do not have such a sensor, the barometric pressure may be estimated or inferred from other sensed operating parameters. As well known in the art, variations in barometric pressure result in corresponding variations in the available power output of the engine or powertrain. While the currently available power is dependent upon the ambient barometric pressure, prior art control strategies adjust various engine control parameters, such as throttle valve position, spark, or fuel, so that the engine output remains relatively constant for a particular accelerator pedal position, independent of the barometric pressure. However, this results in an unresponsive accelerator pedal feel ("dead pedal") after full engine torque is achieved.

Processor 14 receives signals from the various sensors via input ports 36 which may provide signal conditioning and conversion, as well known in the art. Input ports 36 communicate with processor 38 via a data/control bus 40. Processor 38 implements control logic in the form of hardware and/or software instructions which may be stored in computer-readable media 42 to effect control of engine 12. Computer-readable media 42 may include various types of volatile and non-volatile memory such as random-access memory (RAM) 44, read-only memory (ROM) 46, and keep-alive memory (KAM) 48. These "functional" classifications of memory may be implemented by one or more different physical devices such as PROMs, EPROMs, EEPROMs, flash memory, and the like, depending upon the particular application. Computer readable media 42 also store calibration data, generally in the form of lookup tables, used to control engine 12, as well known in the art.

In a preferred embodiment, processor 38 executes instructions stored in computer-readable media 42 to carry out a method for controlling a vehicle powertrain including an internal combustion engine, such as engine 12, using the control logic to process inputs received from the sensors and generate command signals communicated to various actuators of engine 12 via output ports 50. Actuators may control ignition timing or spark (SPK) 52, timing and metering of fuel 54, or position of throttle valve 20 to control air flow. Electronic control of airflow may also be performed using variable cam timing, for example.

Figure 2:
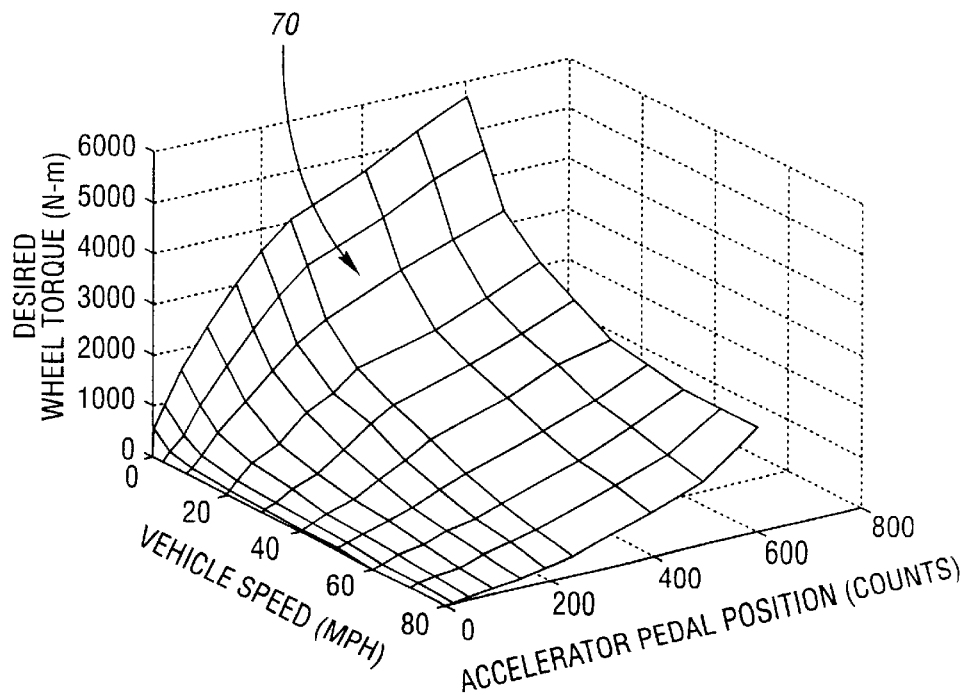
FIG. 2 is a three-dimensional representation of a reference value lookup table for determining a driver demand reference value according to the present invention.

FIG. 2 is a three-dimensional representation of a lookup table containing a reference value used in interpreting driver demand according to the present invention. In a preferred embodiment, driver demand, as indicated by the position of accelerator pedal 24 (FIG. 1) and the vehicle speed 34 (FIG. 1), is interpreted as a desired wheel torque (Nm) for automatic transmission applications. For manual transmission applications, the accelerator pedal position and engine speed are interpreted as desired engine torque. As such, the following description of the invention is applicable to manual transmission applications as well, substituting engine torque for wheel torque and engine speed for vehicle speed.

The signal generated by pedal position sensor 26 is used along with the current vehicle speed to access the base table represented in FIG. 2 to determine the desired wheel torque. The particular values used to populate the driver demand table are application dependent and capable of being calibrated to suit a particular performance or feel. Values 70, represented as the three-dimensional surface in FIG. 2, are generated for a particular base or reference value of barometric pressure. In a preferred embodiment, the reference table is based on a sea level calibration corresponding to a barometric pressure of approximately 30" Hg.

The driver request is modified to compensate for reduced engine torque or power available at lower barometric pressures. As such, the present invention utilizes a barometric pressure modifier to provide a similar response for electronic airflow control as that provided in a mechanical throttle system. In effect, the present invention interprets the driver demand or accelerator pedal position as a request for a portion or percentage of the torque available under the current operating conditions. Preferably, the barometric pressure compensation or adjustment modifies the desired wheel torque based on a ratio of the current barometric pressure to the barometric pressure used to determine reference values 70.

Figure 3:
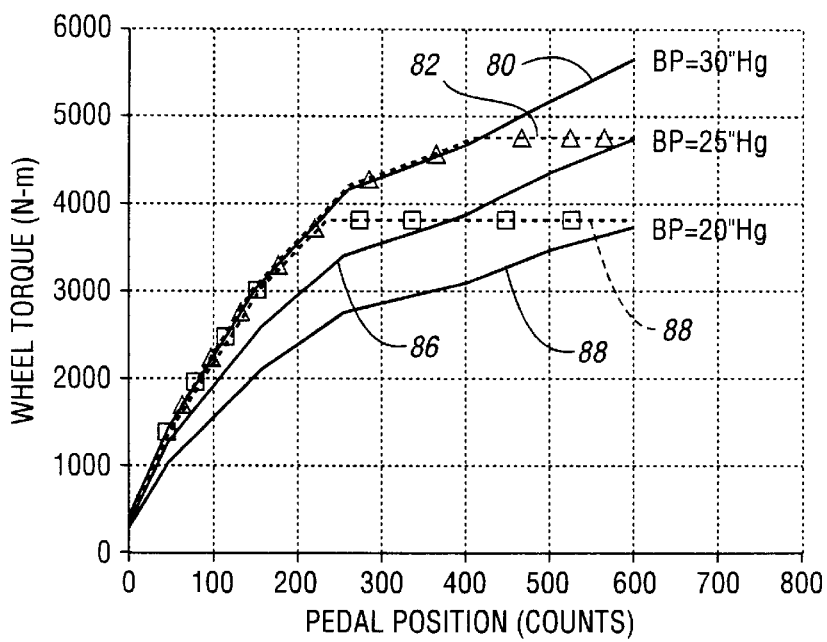
FIG. 3 is a graph comparing the effect of vehicle operation at various barometric pressures with and without barometric pressure compensation according to the present invention.

The effect of the barometric pressure compensation according to the present invention is illustrated in the graph of FIG. 3. The graph plots wheel torque as a function of relative pedal position, which is measured in counts for a particular vehicle speed, for operation under three different barometric pressures. Line 80 represents the base line or reference wheel torque (powertrain output) plotted at the reference barometric pressure of 30" Hg. Because this is the reference or base line value, the plot is the same with or without the barometric pressure compensation according to the present invention. Line 82 represents engine operation at approximately 25" Hg without barometric pressure compensation according to the present invention. As illustrated, for lower accelerator pedal positions, line 82 is collinear with line 80. However, when the accelerator pedal reaches approximately 400 counts, the response is flat because no more torque can be produced by the powertrain. As such, even if the operator continues to depress the accelerator pedal from 400 to 600 counts, no additional torque will be provided. This results in a "dead pedal" or unresponsive feel.

With continued reference to FIG. 3, line 84 represents operation of an engine/powertrain without barometric pressure compensation according to the present invention at approximately 20" Hg. As illustrated, the currently available torque under these operating conditions is only about 3800 Nm. As such, no additional torque is provided once the accelerator pedal position reaches about 200 counts. Thus, the resulting "dead pedal" zone is even larger than in the previous example.

By interpreting the accelerator pedal position as a percentage or portion of the currently available engine or powertrain torque, the present invention eliminates any "dead pedal" when the currently available engine torque is less than the maximum or reference engine torque. Line 86 represents the driver demand as compensated for barometric pressure according to the present invention. As illustrated, the maximum accelerator pedal position is scaled to correspond to the maximum available engine torque (powertrain torque) under the current barometric pressure. As such, the wheel torque continues to increase as the accelerator pedal position counts continue to increase. As such, the full pedal travel is preserved and "dead pedal" is eliminated. A further advantage is that the hysteresis in the shift schedule is preserved when viewed in the pedal position domain. Line 88 represents the barometric pressure compensated driver demand curve for operation with the barometric pressure of about 20" Hg. Again, the driver demand interpretation according to the present invention steadily increases the demanded wheel torque as the pedal position increases to eliminate any "dead pedal" region.

Figure 4:
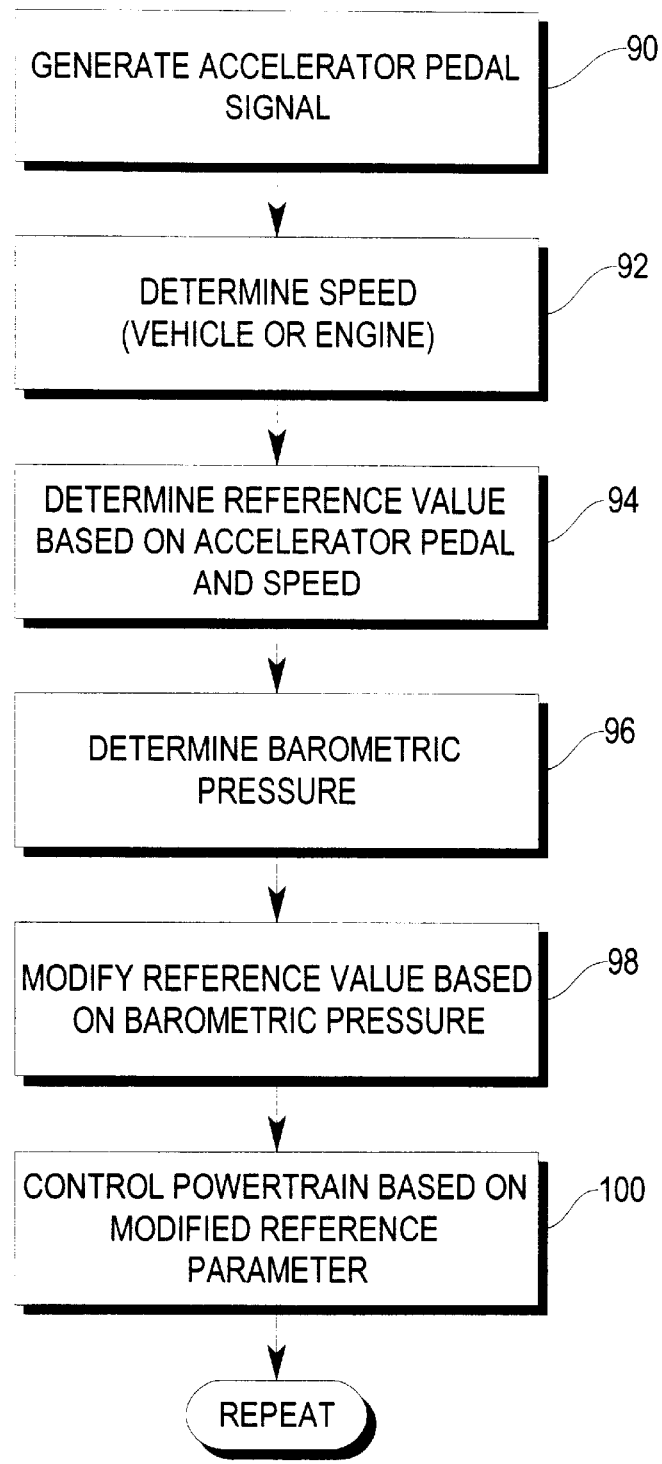
FIG. 4 is a flowchart illustrating control logic for a system or method according to the present invention.

A flowchart illustrating control logic for use in a system or method according to the present invention is illustrated in FIG. 4. One of ordinary skill in the art will recognize that the control logic represented by the flowchart of FIG. 4 may be implemented in software, hardware, or a combination of hardware and software. Likewise, the present invention is independent of the particular processing strategy, which may vary depending upon the particular application. For example, real-time control systems often use interrupt-driven processing strategies with a background loop and one or more "time-critical" loops which are repeated at shorter time intervals. Likewise, an event-driven, sequential, parallel, or other processing strategy may be utilized without departing from the spirit or scope of the present invention. In addition, the order of operations illustrated in FIG. 4 is provided for convenience only. One of ordinary skill in the art will recognize that various steps or functions may be performed in parallel, or simultaneously, while achieving the objects, features, and advantages of the present invention. In a preferred embodiment, the control logic illustrated in FIG. 4 is implemented primarily in software in the powertrain control module.

Block 90 represents generating an accelerator pedal position signal. The accelerator pedal position is utilized along with the speed (vehicle speed or engine speed, depending on the application) as determined at block 92 to determine a reference driver demand as indicated by block 94. Preferably, block 94 includes accessing one or more tables to determine a demanded powertrain output, such as wheel torque, engine torque, or power. The current barometric pressure is determined as represented by block 96. This may be determined directly from an appropriate sensor, such as a MAP sensor, or inferred from various other sensors. The reference value determined by block 94 is modified based on the current barometric pressure relative to the barometric pressure used to determine the reference values as indicated by block 98. The modified value or reference parameter is used to control the output of the powertrain as represented by block 100.

One of ordinary skill in the art will recognize that the barometric pressure compensation strategy of the present invention could be used with a Miller-cycle, turbocharged or supercharged engine with electronic airflow control to modify the driver demanded torque (wheel or engine) under boost conditions in applications where it is desirable to give the driver a more aggressive response to the accelerator pedal position. This provides for a similar response or feel to a mechanical throttle while utilizing a pedal follower or electronic throttle based control system by scaling the driver demand to the additional power or torque available due to the turbocharger or supercharger.

While the best mode for carrying out the invention has been described in detail, those familiar with the art to which this invention relates will recognize various alternative designs and embodiments for practicing the invention as defined by the following claims.

What is claimed is:

1. A method for controlling a vehicular powertrain including an internal combustion engine to compensate for variation in currently available powertrain output, the method comprising:

modifying a driver request for powertrain output based upon the currently available powertrain output to reduce dead pedal at higher altitudes; and controlling the engine based on the modified driver request for powertrain output.

2. The method of claim 1 wherein the step of modifying comprises adjusting the driver request based on barometric pressure.

3. The method of claim 1 further comprising:

determining the driver request for powertrain output based on position of an accelerator pedal.

4. The method of claim 3 further comprising:

determining a speed indicative of current operating conditions;

determining a driver requested torque based on the position of the accelerator pedal and the speed; and wherein the step of modifying a driver request includes multiplying the driver requested torque by a scaling factor based on barometric pressure.

5. The method of claim 4 wherein the step of determining a speed comprises determining a vehicle speed.

6. The method of claim 4 wherein the step of determining a speed comprises determining an engine speed.

7. The method of claim 4 wherein the step of determining a driver requested torque comprises determining a wheel torque.

8. The method of claim 4 wherein the step of determining a driver requested torque comprises determining an engine torque.

9. The method of claim 4 wherein the step of determining a driver requested torque comprises determining a tractive effort.

10. A method for controlling a powertrain including an internal combustion engine, the method comprising:

generating a signal indicative of accelerator pedal position;

generating a signal indicative of a speed representing current operating conditions;

determining a reference powertrain output parameter based on the accelerator pedal position and the signal indicative of the current speed;

determining a value indicative of current barometric pressure;

modifying the reference powertrain output parameter based on the value indicative of current barometric pressure such that a maximum accelerator pedal position corresponds to maximum available powertrain output; and controlling the powertrain based on the modified reference parameter.

11. The method of claim 10 wherein determining a reference powertrain output parameter comprises determining an engine torque.

12. The method of claim 10 wherein determining a reference powertrain output parameter comprises determining an wheel torque.

13. The method of claim 10 wherein modifying the reference engine output parameter comprises scaling the reference engine output parameter by a ratio of current barometric pressure to a reference barometric pressure.

14. A computer readable storage medium having stored therein data representing instructions executable by a computer to control a powertrain including an internal combustion engine, the computer readable storage medium comprising:

instructions for modifying a driver request for powertrain output based upon the currently available powertrain output to reduce dead pedal response at increasing altitudes.

15. The computer readable storage medium of claim 14 wherein the instructions for modifying include instructions for adjusting the driver request based on barometric pressure.

16. The computer readable storage medium of claim 15 further comprising:

instructions for determining the driver request for powertrain output based on position of an accelerator pedal.

17. The computer readable storage medium of claim 16 further comprising:

instructions for determining a speed indicative of current operating conditions;

instructions for determining a driver requested torque based on the position of the accelerator pedal and the speed; and wherein the instructions for modifying a driver request include instructions for multiplying the driver requested torque by a scaling factor based on barometric pressure.

18. The computer readable storage medium of claim 17 wherein the instructions for determining a driver requested torque include instructions for determining a wheel torque.

19. The computer readable storage medium of claim 17 wherein the instructions for determining a driver requested torque include instructions for determining an engine torque.

20. The computer readable storage medium of claim 17 wherein the instructions for determining a driver requested torque include instructions for determining a tractive effort.

21. A method for controlling a vehicular powertrain including an internal combustion engine and an accelerator pedal for providing a signal indicative of driver requested powertrain output wherein the available powertrain output decreases as a function of decreasing barometric pressure, the method comprising:

determining a value indicative of current barometric pressure;

modifying the signal indicative of driver requested powertrain output based on the current barometric pressure such that a maximum accelerator pedal position corresponds to maximum available engine torque for the current barometric pressure.

22. A method for controlling output torque for an internal combustion engine having an electronically controlled throttle including an accelerator pedal in communication with an engine control module, the engine control module controlling a throttle valve to control the output torque of the engine, the method comprising:

determining a parameter indicative of current barometric pressure;

monitoring accelerator pedal position to determine a current driver requested output torque;

adjusting the driver requested output torque based on the current barometric pressure such that an increase in accelerator pedal position results in an increased engine output torque for all barometric pressures.

23. A method for controlling a vehicular powertrain including an internal combustion engine and an electronic throttle control system to reduce dead pedal feel at higher altitudes, the method comprising:

modifying driver requested powertrain output based on current barometric pressure to match accelerator pedal travel to currently available engine torque such that an increase in accelerator pedal position results in increased powertrain output torque.

* * * * *